C. H. HOWARD & H. M. PFLAGER.
ARTICULATED CAR TRUCK.
APPLICATION FILED JULY 25, 1914.
1,144,329.
Patented June 22, 1915.
2 SHEETS—SHEET 2.
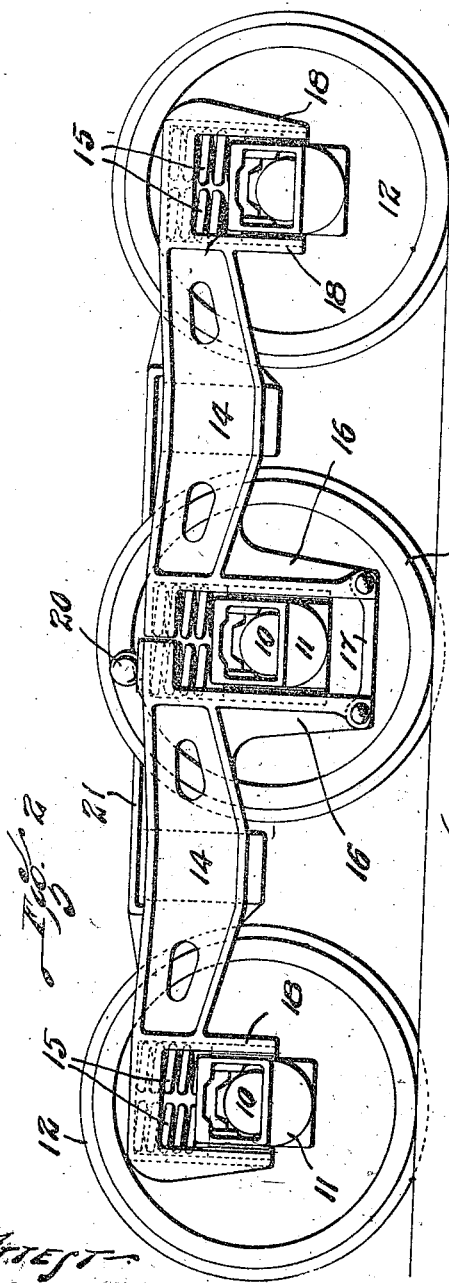
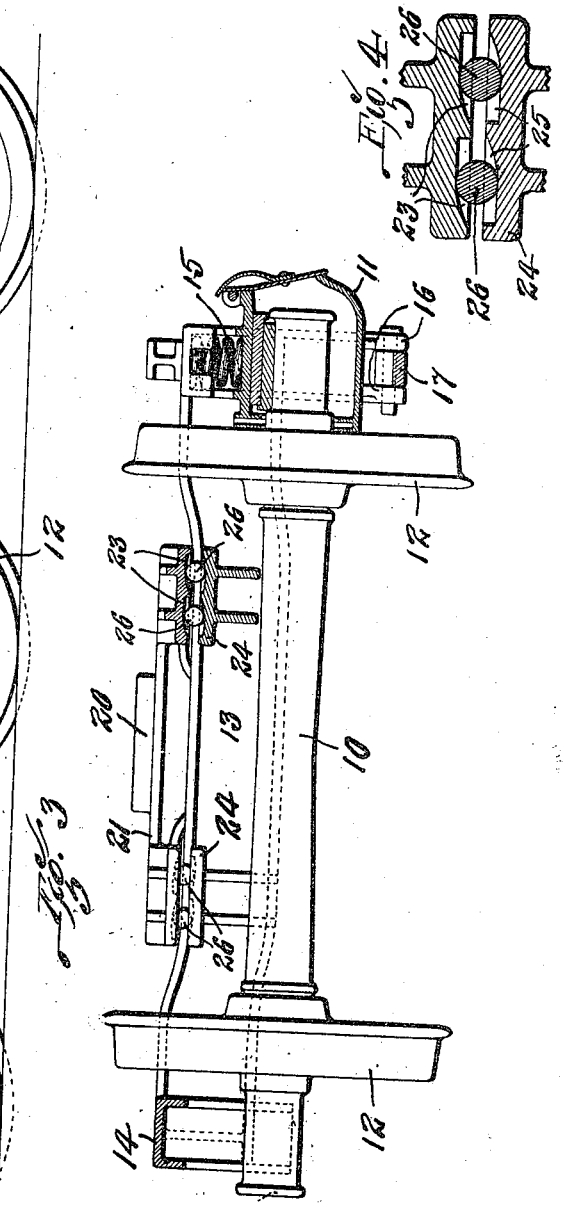

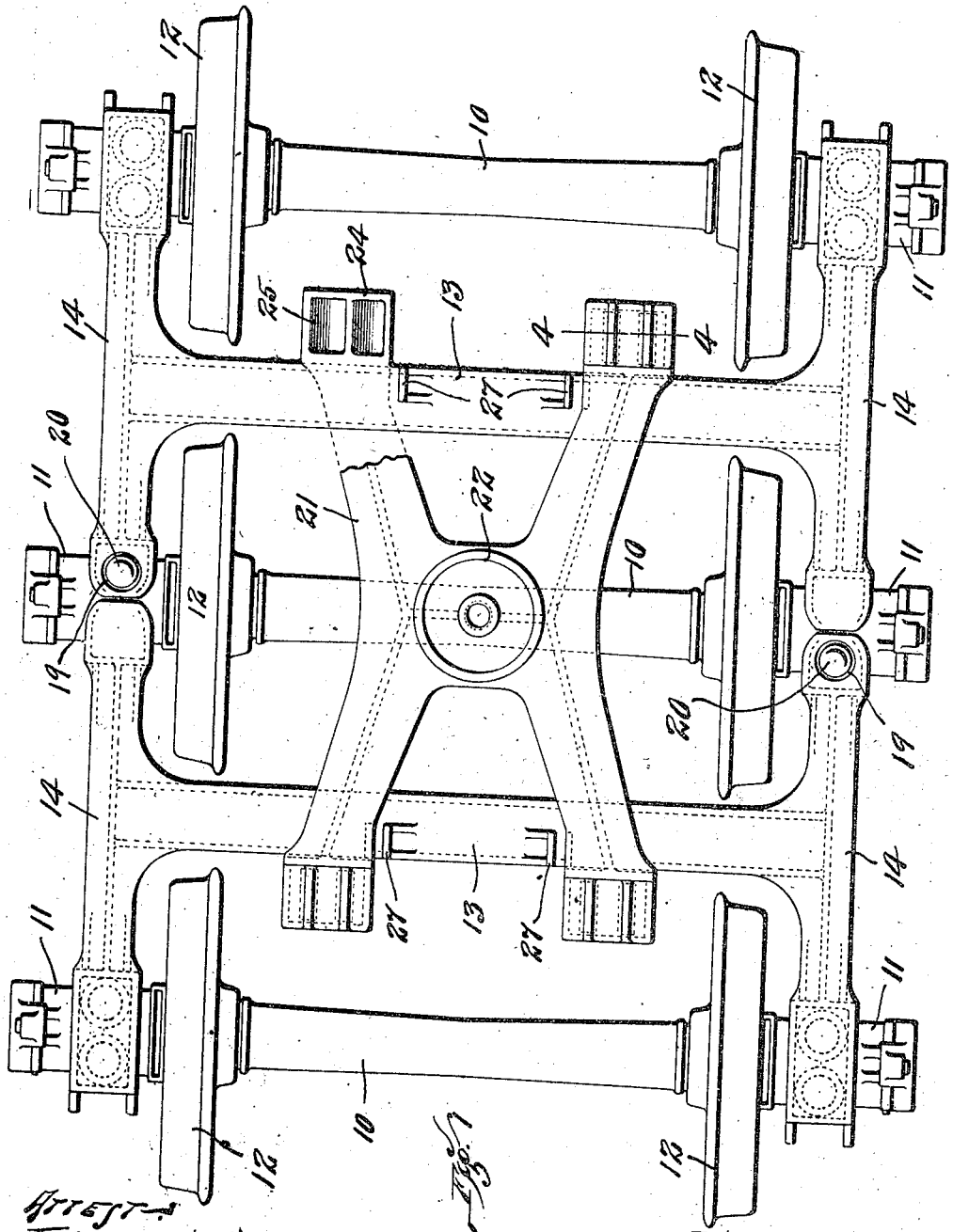

UNITED STATES PATENT OFFICE.

CLARENCE H. HOWARD AND HARRY M. PFLAGER, OF ST. LOUIS, MISSOURI, ASSIGNORS, BY MESNE ASSIGNMENTS, TO COMMONWEALTH STEEL COMPANY, A CORPORATION OF NEW JERSEY.

ARTICULATED CAR-TRUCK.

1,144,329.   Specification of Letters Patent.   Patented June 22, 1915.

Application filed July 25, 1914. Serial No. 852,978.

*To all whom it may concern:*

Be it known that we, CLARENCE H. HOWARD and HARRY M. PFLAGER, citizens of the United States, residing at St. Louis, Missouri, have invented a certain new and useful Improvement in Articulated Car-Trucks, of which the following is a full, clear, and exact description, such as will enable others skilled in the art to which it appertains to make and use the same, reference being had to the accompanying drawings, forming part of this specification, in which—

Figure 1 is a top plan view of an articulated car truck of our improved construction. Fig. 2 is a side elevational view of the truck. Fig. 3 is an end elevational view of the truck with parts thereof in section. Fig. 4 is an enlarged cross sectional view taken on the line 4—4 of Fig. 1.

Our invention relates generally to railway car trucks and more particularly to a six wheel truck of the articulated type, the principal object of our invention being to provide a truck wherein the truck frame is formed in two parts and the center bolster in one part, said parts being combined with each other and with the journal boxes on the axles of the truck, so that loads impressed on the truck will be equally divided between the three axles thereof.

Further objects of our invention are to generally improve upon and simplify the present forms of trucks of the type to which our invention relates; to provide a truck whereby the two parts of the main frame are yieldingly supported upon the journal boxes, and the center bolster being mounted on the truck frame so as to move laterally with respect thereto: to provide suitable side bearings on parts of the articulated frame of the truck, and further to provide a comparatively simple, strong and durable truck of the articulated type which can be easily and cheaply manufactured and readily assembled or taken apart, which latter provision greatly facilitates repairs when the same are necessary.

With the foregoing and other objects in view, our invention consists in certain novel features of construction and arrangement of parts, hereinafter more fully described and claimed.

Referring by numerals to the accompanying drawings, 10 designates the usual axles, the ends of which are positioned in journal boxes 11, and carried by said axles are the usual wheels 12.

The frame of our improved truck is made in two parts which are practically duplicates and of substantially H-shape when viewed in plan. Each part comprises a bolster member 13 with the ends of which are formed integral, side or wheel pieces 14. As shown in the drawings, the bolsters are substantially tubular or hollow and the wheel pieces are substantially of I-beam shape in cross section, although these parts may be varied in shape as desired. When properly assembled, the transoms 13 occupy positions between the truck wheels with the inner ends of the wheel pieces positioned immediately above the journal boxes of the center axle, and the outer ends of said wheel pieces are positioned directly above the journal boxes of the outer axles.

Interposed between the journal boxes and the ends of the wheel pieces are compression springs 15, and thus each part of the frame is yieldingly supported at four points, two of which are upon the inner or center axle and two upon the outer axle.

Formed integral with the inner ends of the wheel pieces are depending brackets 16 which perform the functions of pedestals for the journal boxes on the center axle, and pivotally connected to the lower ends of the corresponding pairs of these pedestals are links or tie bars 17. Formed integral with the outer ends of the wheel pieces are depending pairs of brackets 18 which engage the side faces of the journal boxes on the outer axles, thereby performing the functions of pedestals for said journal boxes.

In order to provide proper side bearings for the truck frame, the inner end of one side piece of each part of the frame is provided with a shallow recess 19 and positioned therein is a ball 20. Spherical side bearings are utilized for the reason that it will be necessary to take care of lateral motion of the center bolster as it moves upon its bearings and also to provide for radial movement of the body bolster relative to the truck and center bolster carried thereby.

The center bolster 21 forming a part of our improved truck is preferably cast in one piece and of substantially H-shape when viewed in plan, and formed on or fixed to the central portion of said center bolster is a center bearing 22. The ends of the arms of this center bolster overlie and project slightly beyond the transoms 13 of the truck frame and formed in the undersides of said ends are pairs of roller seats 23, the same being preferably curved or inclined transversely.

Formed integral with the transoms 13 are outwardly projecting brackets 24 which are positioned immediately beneath the ends of the arms of the center bolster, and formed in the tops of these brackets are pairs of roller seats 25 which are preferably curved or inclined transversely.

Interposed between the ends of the arms of the center bolster and the brackets 24 are pairs of rollers 26, the same bearing directly upon the curved or inclined seats 23 and 25.

Formed integral with the transoms 13 are upwardly projecting brackets 27 which are adapted to form stops to limit the transverse movement of the center bolster relative to the truck frame. Thus, the center bolster is mounted to move laterally with respect to the members forming the truck frame, and by correspondingly curving or inclining the faces of the bearings or roller seats, one side of the center bearing will be slightly elevated as it shifts laterally.

The distance from a line drawn through the centers of the roller bearings on one part of the truck frame to the center of the adjacent outer axle is just half the distance from the center line through the roller bearings to the center of the center axle. By such construction two-thirds of the load impressed on each part of the truck frame is transmitted to the outer axle with which said part is associated, and one-third of said load is transmitted to the center axle, and consequently, the entire load impressed on the truck is equally divided between all three axles.

Inasmuch as the parts of the truck frame are yieldingly supported upon the journal boxes and the center bearing is mounted for lateral movement upon the truck frame, a truck having the requisite degree of flexibility is provided.

A truck of our improved construction is comparatively simple, can be easily and cheaply manufactured, and can be readily assembled or taken apart.

It will be readily understood that minor changes in the size, form and construction of the various parts of our improved truck may be made and substituted for those herein shown and described, without departing from the spirit of our invention, the scope of which is set forth in the appended claims.

We claim:

1. In a car truck, a two-part frame and a bolster, the same being relatively movable laterally with respect to each other, a center bearing on the bolster, a side bearing on each part of the frame.

2. In a car truck, a two-part truck frame, lateral motion devices on each part of the frame, and a center bolster supported by said lateral motion devices.

3. In a car truck, a frame formed in two parts, a center bolster, the parts of said frame and said center bolster being independently movable laterally with respect to each other and a side bearing on each part of the frame.

4. In a car truck, a frame formed in two parts, each of which is spring-supported and independently movable with respect to the other, a center bolster supported by and independently movable laterally with respect to the parts of the frame, and a side bearing on each part of said frame.

5. In a car truck, a frame formed in two parts, and a center bolster which is supported by and movable transversely with respect to the parts of the frame.

6. In a car truck, a frame formed in two parts, a center bolster which is supported by and movable transversely with respect to the parts of the frame, a center bearing on the center bolster, and side bearings on the truck frame.

7. In a car truck, an articulated truck frame, and a center bolster supported upon and movable transversely with respect to said frame.

8. In a car truck, an articulated truck frame, a center bolster, and roller bearings interposed between the frame and bolster, whereby the latter is movable transversely with respect to said frame.

9. In a car truck, a frame formed in two parts, the same being independently movable, and a center bolster supported upon the parts of the truck frame and arranged to move laterally with respect thereto.

10. In a car truck, a frame formed in two parts, the same being independently movable, a center bolster supported upon the parts of the truck frame and arranged to move laterally with respect thereto, a center bearing on the center bolster, and side bearings on the parts of the truck frame.

11. In a car truck, a series of wheel carrying axles, a truck frame formed in two parts which are yieldingly supported upon the axles, and a center bearing supported by and movable laterally with respect to the parts of the truck frame.

12. In a car truck, a frame formed in two parts, roller seats on said parts, a center bolster, roller seats formed thereon, and rollers occupying the roller seats on the parts of the frame and the center bolster, which rollers permit the center bolster to move laterally with respect to the frame.

13. In a car truck, a series of wheel carrying axles, journal boxes therefor, a truck frame formed in two parts, each part having four yielding points of support on the journal boxes, a center bolster, and roller bearings between the parts of the truck frame and said center bolster.

14. In a car truck, a series of wheel carrying axles, journal boxes therefor, a truck frame formed in two parts, each part having four yielding points of support on the journal boxes, a center bolster, roller bearings between the parts of the truck frame and said center bolster, a center bearing on the center bolster, and side bearings on the parts of the truck frame.

15. In a car truck, a frame formed in two parts, each comprising a transom and a pair of wheel pieces, pedestals depending from said wheel pieces for engagement with the journal boxes of the truck, and springs arranged beneath said wheel pieces.

16. In a car truck, a frame formed in two parts, each comprising a transom and a pair of wheel pieces, pedestals depending from said wheel pieces for engagement with the journal boxes of the truck, springs arranged beneath said wheel pieces, and a center bolster mounted for lateral movement upon the parts of the truck frame.

17. In a car truck, a frame formed in two parts, each comprising a transom and a pair of wheel pieces, pedestals depending from said wheel pieces for engagement with the journal boxes of the truck, springs arranged beneath said wheel pieces, and a side bearing arranged on one wheel piece of each part of the truck frame.

18. In a car truck, a series of wheel carrying axles, journal boxes therefor, a truck frame comprising a pair of substantially H-shaped members, springs interposed between the journal boxes and parts of the truck frame members, and a substantially H-shaped center bolster mounted for lateral movement upon the members forming the truck frame.

19. In a car truck, a series of wheel carrying axles, journal boxes therefor, a truck frame comprising a pair of substantially H-shaped members, springs interposed between the journal boxes and parts of the truck frame members, a substantially H-shaped center bolster mounted for lateral movement upon the members forming the truck frame, and center bearings on said center bolster and a side bearing on each of the members of the truck frame.

20. In a car truck, a truck frame formed in two parts each comprising a transom and a pair of wheel pieces, each part being independently movable with respect to the other part, a center bolster supported upon said truck frame, and lateral motion devices between said bolster and truck frame.

21. In a car truck, an articulated truck frame, a center bolster supported thereby, and lateral motion devices between the bolster and truck frame.

22. In a car truck, a frame formed in two parts each composed of a transom and a pair of wheel pieces, a bolster supported by said frame, and side bearings on said wheel pieces.

23. In a car truck, a frame formed in two parts, the same being independently movable, a center bolster supported by and movable transversely with respect to the parts of the frame, lateral motion devices between the bolster and frame, and side bearings on the parts of said frame.

24. In a car truck, a truck frame formed in two parts which are independently movable with respect to each other, side bearings on said parts, and a center bearing supported by and movable laterally with respect to the parts of the truck frame.

25. In a car truck, a truck frame formed in two parts, the same being spring-supported and independently movable with respect to each other, a center bolster supported by said two-part frame, and lateral motion devices between said bolster and the parts of said frame.

In testimony whereof we hereunto affix our signatures in the presence of two witnesses, this 18th day of July, 1914.

CLARENCE H. HOWARD.
HARRY M. PFLAGER.

Witnesses:
HAL C. BELLVILLE,
OTTO V. MYERS.